US008782029B1

(12) United States Patent
Yee et al.

(10) Patent No.: US 8,782,029 B1
(45) Date of Patent: Jul. 15, 2014

(54) CUSTOMIZING IMAGE SEARCH FOR USER ATTRIBUTES

(71) Applicant: Google Inc., Mountain View, CA (US)

(72) Inventors: Yangli Hector Yee, San Francisco, CA (US); Charles J. Rosenberg, Cupertino, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/959,233

(22) Filed: Aug. 5, 2013

Related U.S. Application Data

(63) Continuation of application No. 12/108,399, filed on Apr. 23, 2008, now Pat. No. 8,504,547.

(51) Int. Cl.
*G06F 17/30* (2006.01)
*G06F 7/00* (2006.01)

(52) U.S. Cl.
USPC .......................................... 707/706; 707/721

(58) Field of Classification Search
USPC .................................................. 707/721, 706
See application file for complete search history.

(56) References Cited

U.S. PATENT DOCUMENTS

| | | |
|---|---|---|
| 5,390,259 A | 2/1995 | Withgott et al. |
| 5,579,471 A | 11/1996 | Barber et al. |
| 5,893,095 A | 4/1999 | Jain et al. |
| 6,182,068 B1 | 1/2001 | Culliss |
| 6,463,426 B1 | 10/2002 | Lipson et al. |
| 6,519,557 B1 | 2/2003 | Emens et al. |
| 6,581,034 B1 | 6/2003 | Choi et al. |
| 6,618,727 B1 | 9/2003 | Wheeler et al. |
| 6,785,669 B1 | 8/2004 | Aggarwal et al. |
| 7,451,130 B2 | 11/2008 | Gupta et al. |
| 7,577,665 B2 | 8/2009 | Ramer et al. |
| 7,623,712 B2 | 11/2009 | Dai et al. |
| 7,734,621 B2 | 6/2010 | Weitzman et al. |
| 8,032,507 B1 | 10/2011 | Bayardo et al. |
| 2005/0065916 A1 | 3/2005 | Ge et al. |
| 2005/0262050 A1 | 11/2005 | Fagin et al. |
| 2007/0100822 A1 | 5/2007 | Freeman et al. |
| 2007/0185864 A1 | 8/2007 | Budzik et al. |

OTHER PUBLICATIONS

Fagin et al., "Comparing Top K Lists," Society for Industrial and Applied Mathematics, 2003, 17(1):134-160.

*Primary Examiner* — Pavan Mamillapalli
(74) *Attorney, Agent, or Firm* — Fish & Richardson P.C.

(57) ABSTRACT

Systems, method, and apparatus including computer program products for providing image search results. In some implementations, a method is provided. The method includes receiving from a user a query for images including static images, moving images, and images within multimedia content, identifying at least one of a language attribute and a locale attribute of the user, generating multiple search results, each result corresponding to an image content item that satisfies the query, ordering the search results based at least on click data for image content items that satisfy the query, the click data gathered from users having at least one of the language attribute and the locale attribute, and presenting the ordered search results to the user, including presenting representations of the corresponding image content items.

15 Claims, 5 Drawing Sheets

400

402  406  408

| Query: haj | Total Clicks | Indian/ English Clicks | Swedish/ English Clicks | ... |
|---|---|---|---|---|
| Image 1 | 1000 | 20 | 100 | ... |
| Image 2 | 900 | 90 | 20 | ... |
| Image 3 | 800 | 100 | 10 | ... |
| ⋮ | ⋮ | ⋮ | ⋮ | |

CUSTOMIZING IMAGE SEARCH FOR USER ATTRIBUTES

CROSS-REFERENCE TO RELATED APPLICATION

This application is a continuation of U.S. application Ser. No. 12/108,399, filed Apr. 23, 2008, the disclosure of which is hereby incorporated by reference in its entirety.

BACKGROUND

This specification relates to providing image search results.

Internet search engines aim to identify resources (e.g., web pages, images, text documents, processes, multimedia content) that are relevant to a user's needs and to present information about the resources in a manner that is most useful to the user. In response to a query submitted by a user, search engines return search results referring to resources identified as relevant to or matching the query. Unfortunately, a user submitted query may include terms that do not align well with the intentions of the user, for example, if there is ambiguity in the meaning of the query terms. Even if the search results returned are relevant objectively to the user submitted query, the results may not be relevant to or may be broader or narrower than the user's subjective needs. For example, a particular query term can have a different meaning depending on language or location attributes of the user submitting the query term. Consequently, the same search results for a query term presented to a user at one location may not be relevant to a different user at another location.

SUMMARY

Systems, method, and apparatus including computer program products for providing image search results. In general, one aspect of the subject matter described in this specification can be embodied in methods that include the actions of receiving from a user a query for images including static images, moving images, and images within multimedia content; identifying at least one of a language attribute and a locale attribute of the user; generating multiple search results, each result corresponding to an image content item that satisfies the query; ordering the search results based at least on click data for image content items that satisfy the query, the click data gathered from users having at least one of the language attribute and the locale attribute; and presenting the ordered search results to the user, including presenting representations of the corresponding image content items. Other embodiments of this aspect include corresponding systems, apparatus, and computer program products.

These and other embodiments can optionally include one or more of the following features. Ordering the search results further includes identifying a first set of images from the images corresponding to the generated multiple search results for a first group of users, the first group of users having various attributes, identifying a second set of images from the images corresponding to the generated multiple search results for a second group of users, the second group of users having the language attribute and locale attribute of the user, and calculating a similarity between the first set of images and the second set of images. The ordering of the search results is based on the second set of images when the similarity between the first set of images and the second set of images is less than a specified threshold value. The ordering of the search results is based on the first set of images when the similarity between the first set of images and the second set of images is greater than or equal to a specified threshold value.

Calculating the similarity includes comparing a number of images in common between the first set of images and the second set of images. The first set of images includes a first top k list of images corresponding to image search results most frequently accessed by users of the first group of users submitting the query for images. The second set of images includes a second top k list of images corresponding to image search results most frequently accessed by users of the second group of users submitting the query for images.

In general, one aspect of the subject matter described in this specification can be embodied in methods in a system having an image database and statistics of accesses of images in the image database by users, the users including users that have a specified attribute is provided. The methods include the actions of receiving a query for images; identifying multiple images from the image database that satisfies the query; identifying a first set of images from the multiple images based on the statistics of accesses of the multiple images by the users; identifying a second set of images from the multiple images based on statistics of accesses of the multiple images by the users having the specified attribute; determining a degree of set similarity between the first set and the second set; and if the degree of set similarity is greater than a specified threshold, presenting search results in response to the query, the search results including representations of the multiple images, wherein the search results are ordered based at least in part on the statistics of accesses of the multiple images by the users, and if the degree of set similarity is not greater than the specified threshold, presenting search results in response to the query, the search results including representations of the multiple images, wherein the search results are ordered based at least in part on the statistics of accesses of the multiple images by the users having the specified attribute. Other embodiments of this aspect include corresponding systems, apparatus, and computer program products.

These and other embodiments can optionally include one or more of the following features. The specified attribute includes at least one of language and locale. Determining the set similarity between the first set and the second set includes comparing a number of images in common between the first set of images and the second set of images.

Particular embodiments of the subject matter described in this specification can be implemented to realize one or more of the following advantages. Image query search results are ordered to present search results that are relevant to a user based on one or more of the user's attributes. Additionally, by reordering search results when particular attributes significantly change the search results, and otherwise ignoring attributes, memory space is conserved (e.g., for one or more search servers).

The details of one or more embodiments of the subject matter described in this specification are set forth in the accompanying drawings and the description below. Other features, aspects, and advantages of the invention will become apparent from the description, the drawings, and the claims.

BRIEF DESCRIPTION OF THE DRAWINGS

FIG. 4 shows an example of attribute-pair click data for images.

Like reference numbers and designations in the various drawings indicate like elements.

DETAILED DESCRIPTION

Figure 1:
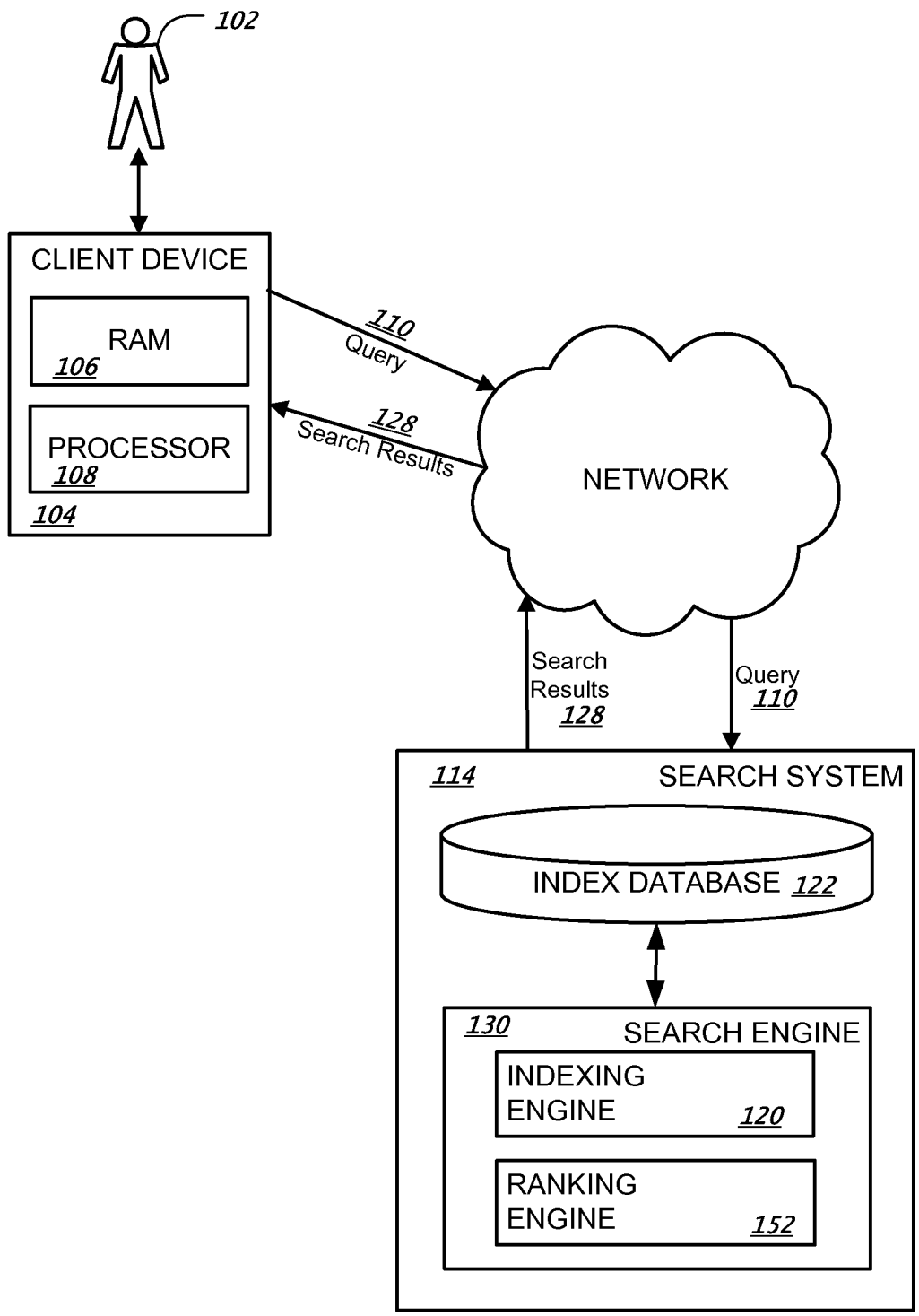
FIG. 1 shows an example search system.

FIG. 1 shows an example search system 114 for providing search results relevant to submitted search queries as can be implemented in an internet, an intranet, or another client and server environment. The search system 114 is an example of an information retrieval system in which the systems, components, and techniques described below can be implemented.

A user 102 can interact with the search system 114 through a client device 104 (e.g., a personal computer, a mobile telephone, a personal digital assistant, a mobile audio or video player, a game console, or a combination of one or more of them). For example, the client 104 can be a computer coupled to the search system 114 through a local area network (LAN), e.g., an enterprise intranet, or a wide area network (WAN), e.g., the Internet. In some implementations, the search system 114 and the client device 104 can be one machine. For example, a user can install a desktop search application on the client device 104. The client device 104 will generally include a random access memory (RAM) 106 and a processor 108.

A user 102 can connect to a search engine 130 within a search system 114 to submit a query 110. When the user 102 submits a query 110, the query 110 is transmitted through one or more wired or wireless networks to the search system 114. The search system 114 can be implemented as, for example, computer programs running on one or more computers in one or more locations that are coupled to each other through a network. The search system 114 includes an index database 122 and a search engine 130. The search system 114 responds to the query 110 by generating search results 128, which are transmitted through the network to the client device 104 in a form that can be presented to the user 102 (e.g., as a search results web page to be displayed in a web browser running on the client device 104).

When the query 110 is received by the search engine 130, the search engine 130 identifies relevant resources (i.e., resources matching or satisfying the query 110, e.g., an image). The search engine 130 will generally include an indexing engine 120 that actively searches a corpus of resources (e.g., web pages, images, or documents including news articles on an intranet or the Internet) to index the resources found in that corpus, and stores index information for the resources in an index database 122. This index database 122 is used to identify resources that match the query 110.

The search engine 130 will generally include a ranking engine 152 (or other software) to rank the resources related to the user query 110. The ranking of the resources can be performed using conventional techniques for determining an information retrieval score for indexed resources in view of a given query. The relevance of a particular resource with respect to a particular query term or to other provided information may be determined by any appropriate technique. The search engine 130 can transmit the search results 128 through the network to the client device 104 for presentation to the user 102.

Figure 2:
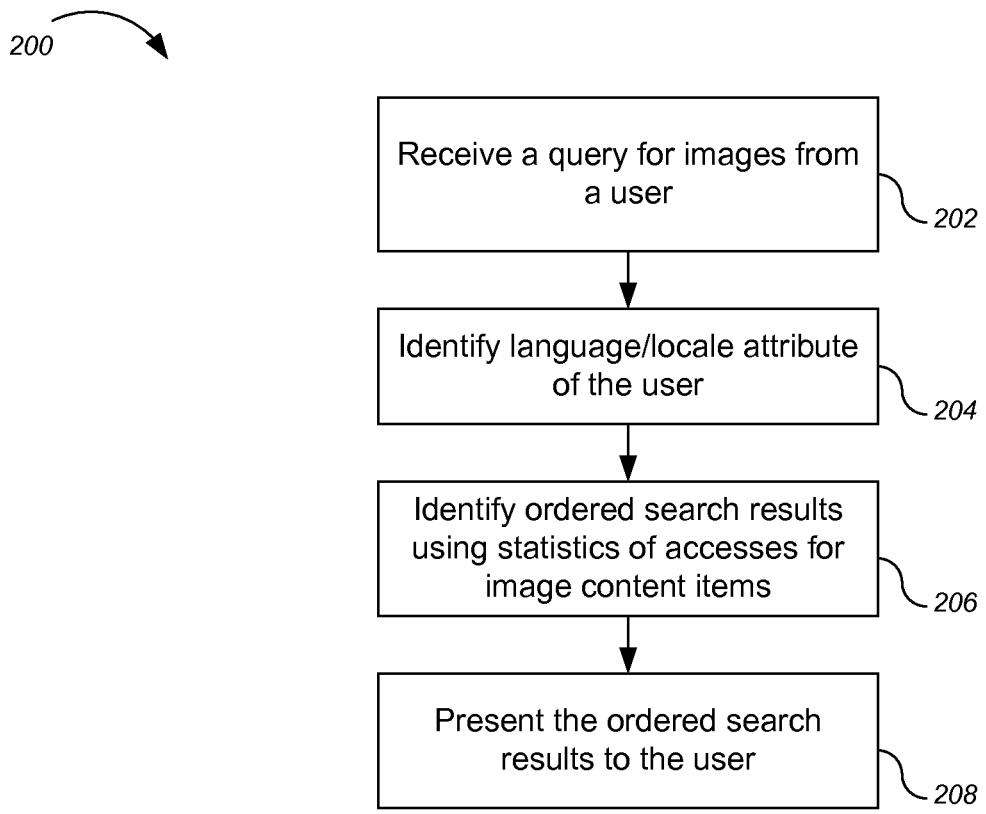
FIG. 2 shows an example process for presenting results to a query for images using one or more user attributes.

FIG. 2 shows an example process 200 for presenting results to a query for images using one or more user attributes. For convenience, the process 200 will be described with respect to a system that performs the process 200 (e.g., search system 114).

The system receives 202 a query for images from a user. The query for image includes one or more query terms. The query terms can include, for example, words or phrases. The query for images can be received, for example, using a search interface presented to the user in a web browser running on a client device. The search interface can include a search text field. The user can input the query for images into the search text field and then initiate a search (e.g., by selecting a search button). The images can include, for example, static images, moving images, and images within multimedia content.

The system identifies 204 attributes of the user. The attributes of the user can include, for example, a user locale and a user language. In some implementations, the system uses attribute combinations to form one or more attribute-pairs (e.g., a locale-language attribute-pair). The system can identify the locale of the user using one or more locating techniques. For example, the system can use an IP address of the client device associated with the user to infer the user's locale. In some implementations, the search interface accessed by the user associates the user with a particular locale. For example, a user accessing a search interface by pointing their client browser to "http://www.google.it" can be identified as having a locale of Italy while a second user accessing a search interface, by pointing their respective client browser to "http://www.google.in", can be identified as having a locale of India.

In some implementations, a user profile is used to identify the locale of the user. For example, a user account associated with the search interface can include information about the user's locale as provided by the user (e.g., a city or postal code). In some other alternative implementations, the system uses one or more cookies located on the user's client device to identify one or more attributes of the user. For example, the cookie data can identify the user with respect to previously provided profile information for the user, which can then be retrieved.

The system can identify the user language using similar techniques. For example, the search interface is presented in a particular language, which can indicate the user's language. For example, a user accessing "http://www.google.it", which provides a search interface in Italian, which indicates the user is an Italian language user. In another example, the search interface optionally presents content in a number of languages from which the user can select a particular language. For example, a user accessing "http://www.google.in" can choose a search interface in English, Hindi, Bengali, Telugu, Marathi, and Tamil. The user's selection can be used to identify the user's language attribute.

In some implementations, the system uses the user's locale to infer the language of the user. For example, if the user is associated with a locale in Sweden, the language associated with the user can also be identified as Swedish. Alternatively, the system can use the language of the input to the search interface to identify the user's language. For example, if a user provides a query for images in Italian then the user's language, or alternatively, the relevant language for the query for images, can be identified as Italian. The language of the query is identified, for example, using language dictionaries or machine translation systems. In some other implementations, for example for particular languages including Chinese, Japanese, and Korean, the system identifies the user's language from a Unicode character range of the user's input to the search interface.

The system identifies 206 ordered search results using statistics of accesses for image content items and the user's identified attributes. Statistics of accesses include historical information identifying, for example, the number of times a particular image search result has been selected, or the number of times the associated image resources have been accessed, by users according to particular criteria. The system can use the statistics of accesses along with the attributes identified for the user to determine the ordering of the search results responsive to the received query for images. Identifying ordered search results is described in greater detail with respect to FIG. 3.

Figure 3:
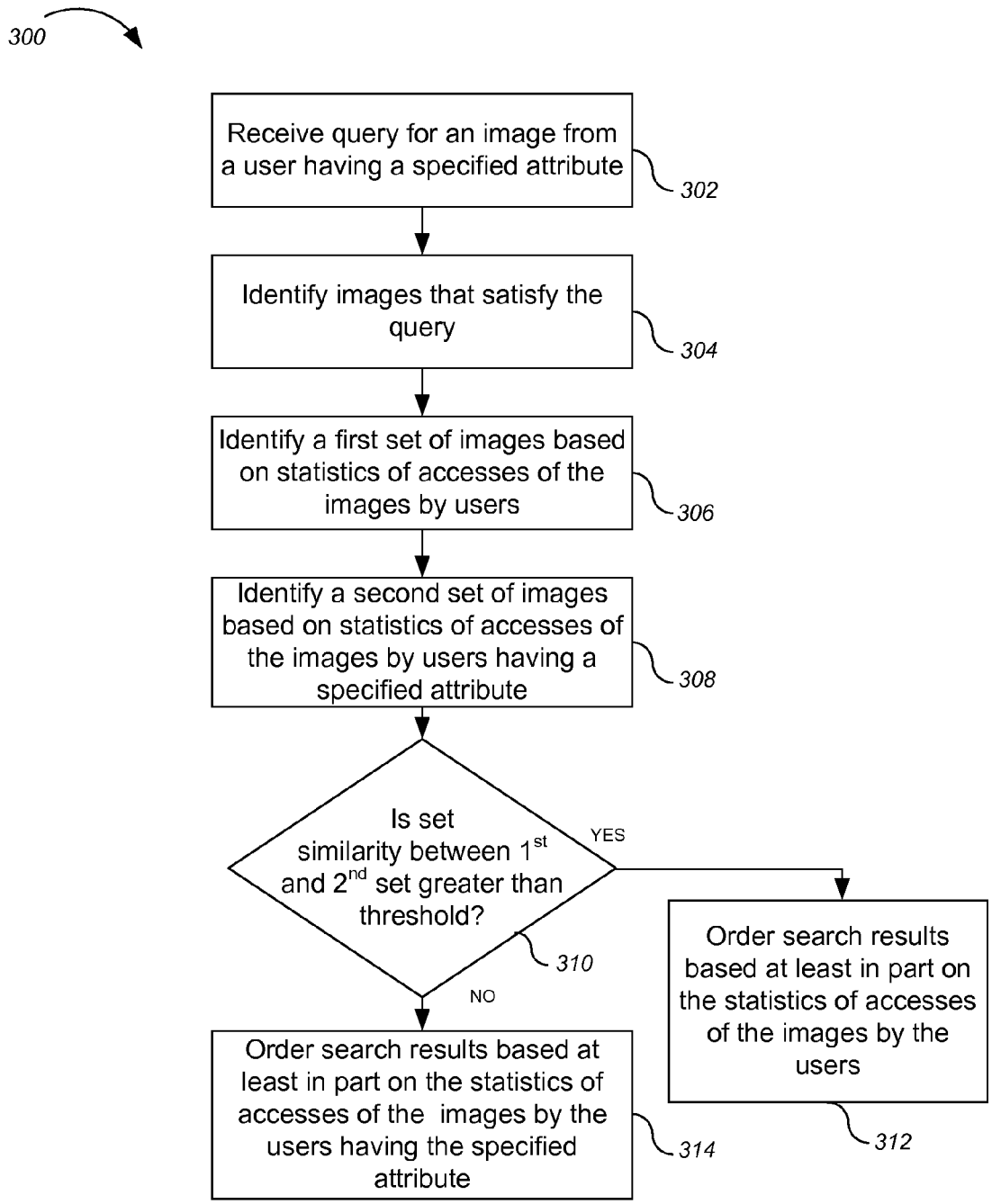
FIG. 3 shows an example process for identifying ordered search results.

FIG. 3 shows an example process 300 for identifying ordered search results. For convenience, the process 300 will be described with respect to a system that performs the process 300 (e.g., search system 114).

The system receives 302 a query for images from the user having one or more specified attribute (e.g., a currently submitted query for images). For clarity this will sometimes be referred to as a current query for images. The system can receive the query for images and identify attributes for the user, for example, as describe with respect to FIG. 2. In some implementations, the system receives the query for images from a user having a particular locale and language attribute-pair. For example, the query for an image can be received from an English language user in India. Thus, the locale-language attribute-pair is Indian-English.

The system identifies 304 a collection of images that satisfies the query for images. The system identifies image resources that satisfy the query for images, for example, using a search engine. The search engine identifies relevant resources (e.g., resources matching or satisfying the query for images), for example as described above with respect to FIG. 1. In some implementations, the search engine provides search results that have been initially ordered to rank the identified images related to the query for images. The search engine can perform the ranking of the images using conventional techniques for determining an information retrieval score (e.g., a term frequency-inverse document frequency "tf-idf" score) for indexed images in view of a given query for images.

In some implementations, the search engine is remotely located from the system. The system can submit the query for images and receive a collection of images that satisfy the query. The received collection of images may be ordered or unordered. In some implementations, the search engine returns ordered search results responsive to the query for images. For example, the search results can be ordered according to the respective information retrieval scores of the resources associated with the respective search results.

The system identifies 306 a first set of images from the collection of images that satisfies the query for images based on statistics of accesses of search results corresponding to the images by a first group of users. The first group of users has as members users who previously submitted a corresponding query for images. Statistics of accesses of the images include historical data identifying the number of times each image search result was selected (e.g., clicked) by users of the first group of users in response to submitting the corresponding query for images (e.g., the same or similar query for images). Similar queries can be, for example, queries for images that are synonymous with the received query for images or queries for images that result in search results including a specified threshold of the same images as satisfying the received query for images. Thus, for the first group of users, the system can obtain a click count for each particular image search result that is responsive to the query for images. Obtaining statistics of accesses can include retrieving log data associated with user search queries for images.

In some implementations, the first set of images includes a specified number of images having a threshold score (e.g., based on an information retrieval score associated with each image) to form a first top k list of images, where k is an integer number (e.g., a top 10 list of images). For example, the system can determine the first top k list at least in part according to the number of accesses for each image that satisfies the query for images (e.g., k images in order of descending clicks). Thus, the first set of images can include the top k images from the collection of images determined according to the number of accesses for each corresponding search result.

For example, a query for images "haj" can result in the system identifying a first set of images, of the collection of images that satisfy the query, where at least a specified threshold of accesses have occurred. The first set of images can include, for example, a first image having 1000 accesses, a second image having 900 accesses, and a third image having 800 accesses. Additionally images can be included in the first set having a threshold number of accesses up to k total images. Similarly, some search results corresponding to images of the collection of images can have insufficient accesses to be included in the first set of images. In some implementations, the system aggregates the statistics of accesses over a specified period of time (e.g., the last week, month, or year) for a particular group of users that submitted a corresponding query for images (e.g., "haj").

The system identifies 308 a second set of images from the identified collection of images that satisfies the query for images based on statistics of accesses of the search results corresponding to the images by a second group of users. The second group of users includes members having a specified attribute who previously submitted a corresponding query for images. In particular, the second set of images includes images accessed by members of the second group of users having one or more specified attributes corresponding to one or more specified attributes of the user that submitted the current query for images. For example, if a user submitting the current query for images has a locale-language attribute-pair of India-English, then the system identifies a second set of images based on statistics of accesses by the second group of users, each having the same India-English attribute-pair.

Thus, the statistics of accesses of the images include the number of times the search result was selected (e.g., clicked) by members of the second group of users having corresponding attributes who submitted a corresponding query for images as the submitting user. The system can identify and order the second set of images according to a second top k list based on the accesses by the second group of users (e.g., the images of the collection of images that were most accessed by members of the second group of users). The second top k list can include the same images as the first top k list for all accesses having a same or different ordering or can include different images. Thus, the ordering of the second top k list can be different or have different images as compared with the first top k list.

For example, a query for images "haj" can result in the system identifying a second set of images, of the collection images that satisfy the query for images, where at least a specified threshold of accesses have occurred by users of the second group of users having the one or more specified attributes of the user submitting the current query for images (e.g., users having the Indian-English attribute-pair). The second set of images can include, for example, the third image having 100 accesses, the second image having 90 accesses and the third image having 20 accesses from members of the second group of users having the attribute-pair.

There can be many different attribute-pairs for users (e.g., German-German, German-English, Indian-Hindi). However, the sum of accesses across all user attributes is equal to the total number of accesses for all users (e.g., the sum of accesses across all distinct user attribute-pairs for the first image is 1000).

FIG. 4 shows an example of attribute-pair click data 400 for images. The click data includes statistics of accesses for particular language locale attribute pairs for images presented in response to a query for images. In particular, example click data is shown for images 404 responsive to a query for images "haj". Column 402 shows total clicks of image search results by users that submitted the query "haj". For example, 1000 users clicked on image 1, 900 users clicked on image 2, and 800 user clicked on image 3. By contrast, columns 406 and 408 show total clicks of image search results to the query for images by groups of users having a particular attribute-pair. For example, column 406 shows clicks for Indian-English users while column 408 shows clicks for Swedish-English users. In particular, the click data can vary for images depending on the attribute-pairs of the users. For example, image 3 had 100 clicks from Indian-English users but only 10 clicks from Swedish-English users. Thus, as shown in FIG. 4, accesses to search results for a query for images can vary depending on the attributes of the particular users.

In some implementations, the second top k list for the second set of images has a threshold number of accesses in order to be on the list. For example, the second top k list can include up to 10 images having at least a specified number of accesses (e.g., at least 90 clicks). The system can discard images having less than the threshold number of clicks, which in some implementations, results in the second top k list having less than k images.

As shown in FIG. 3, the system determines 310 whether a set similarity between the first set of images and the second set of images is greater than a threshold similarity. For example, the system can compare the first and second top k lists for the first and the second set of images. The system can compare the top k lists using different techniques, for example, as described below.

In some implementations, the first set and the second set are compared to calculate a set similarity score. The set similarity score is calculated as a function of the number of common images between the first and the second set of images and a minimum number of images found in each set (e.g., to normalize the score). In particular, the set similarity score can be calculated as:

$$\text{set\_similarity\_score} = \frac{|\text{\#images\_first\_set} \cap \text{\#images\_second\_set}|}{\min(|\text{\#images\_first\_set}, \text{\#images\_second\_set}|)},$$

where $$|\text{\#images\_first\_set} \cap \text{\# images\_second\_set}|$$

is the number of images in common between the first set and the second set and min $$(|\text{\#images\_first\_set}, \text{\#images\_second\_set}|)$$

is the minimum number of total images from both sets (i.e., each set has at least this many images). Thus, for example, if the first set of images and the second set of images have two images in common and the first set of images and the second set of images each have at least 10 images, then the set similarity score is 2/10 or 0.2. The higher the set similarity score, the more similar the first and second sets. A set similarity score above the specified threshold can indicate that the user attributes of the second set of images do not significantly effect the accessed images from search results provided in response to a query for images. A particular threshold set similarity score can be specified (e.g., 0.41). The set similarity score described above does not rely on the ordering within the first and second sets (e.g., the ordering within the top k list does not matter), providing an advantage over set similarity measures that rely on an ordering of top k lists.

In other implementations, the top k lists of the first set of images and the second set of images are compared using other techniques. For example, a combination of one or more of Kullback Liebler Divergence, Chi Square, Kendall's Tau, or Spearman's Rho. Techniques for comparing top k lists are described, for example, in Fagin et. al "Comparing Top k Lists", Discrete Math, Vol. 17, No 1, pages 134-160 (2003).

When the set similarity is greater than the threshold value, the system orders 312 the search results responsive to the query for images based at least in part on the statistics of accesses of the images. In particular, the search results are ordered without regard for specific accesses for users having particular attributes. For example, in some implementations, the search results are ordered according to, or beginning with, the first set of images. Alternatively, the system can order search results corresponding to the collection of images according to the information retrieval scores identified for the collection of images. In some implementations, other ranking weights are used as additional factors in ordering the images. Thus, when the sets are similar enough to each other, no reordering of search results is performed.

When the set similarity is less than the threshold value, the system orders 314 the search results responsive to the query for images based at least in part on the statistics of accesses of the images by the users having the specified attribute of the user. In some implementations, the search results are ordered according to accesses associated with a specified attribute-pair of the user. For example, in some implementations the system orders the search results according to the second set of images. Thus, when the sets are dissimilar enough, they are reordered according to one or more attributes of the user submitting the current query for images.

Alternatively, the search results are ordered beginning with the search results corresponding to the second top k list followed by search results corresponding to other images of the collection of images based, for example, on their respective information retrieval scores or in decreasing order of accesses by users having the specified attribute-pair. In some implementations, other ranking weights are used as additional factors in ordering the images.

As shown in FIG. 2, the system presents 208 the ordered search results to the user. For example, the ordered search results can be presented in a web page displayed in the browser of the client device. Each image search result can include a label for the particular image from a resource, a selectable link to the resource, and a thumbnail image of the particular image. The user can select a particular image search result in order to access the corresponding resource (e.g., a web page that includes the image presented in the selected image search result). The user can return to the presented search results (e.g., by selecting a browser back button). Additionally, the user can submit a new query for images, which can also be presented in an order depending on a calculated set similarity score.

Figure 5:
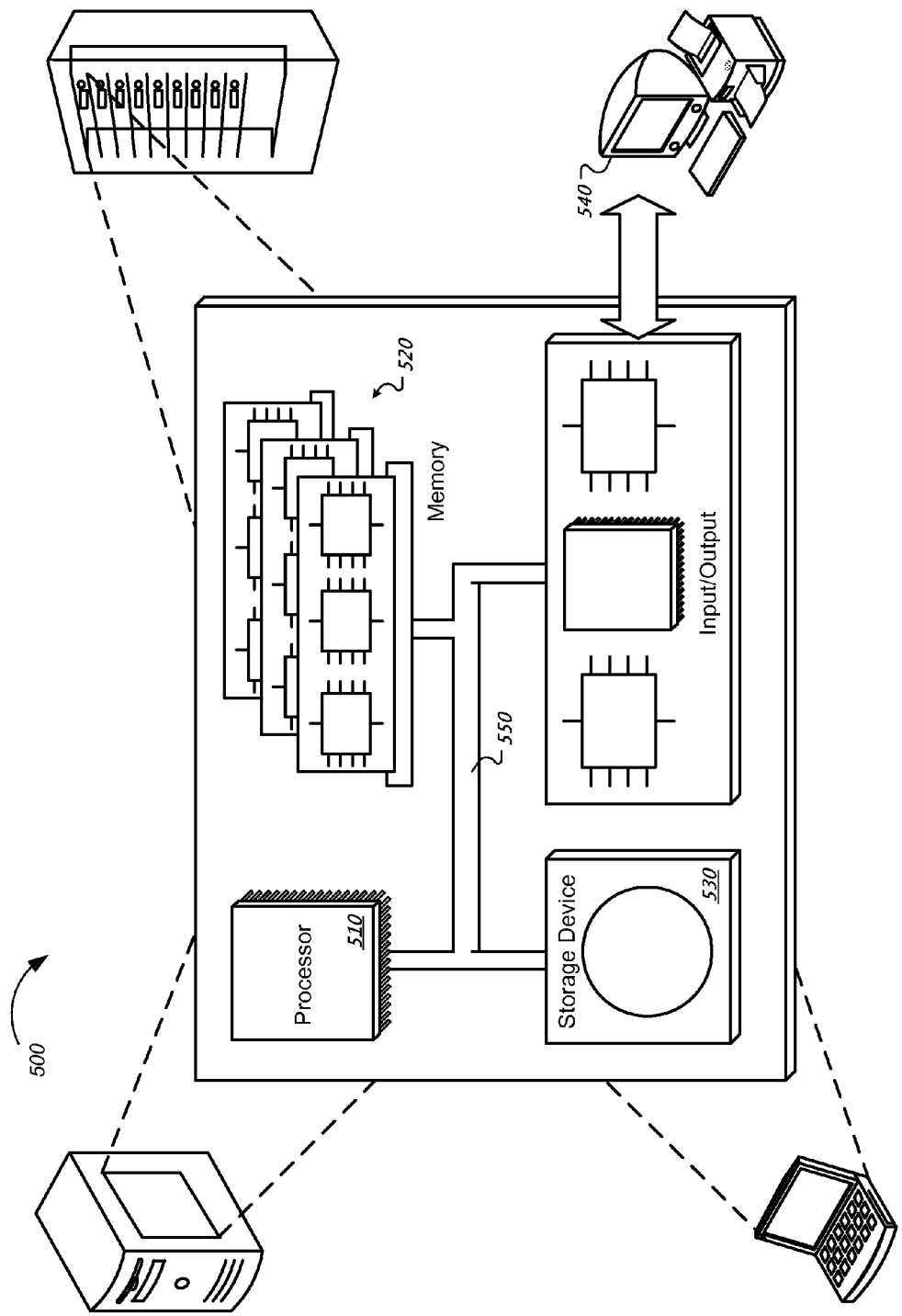
FIG. 5 is a schematic diagram of a generic computer system.

FIG. 5 is a schematic diagram of a generic computer system 500. The system 500 can be used, for example, for practicing operations described in association with the technique 200 of FIG. 2 in one embodiment or the technique 300 of FIG. 3 in another embodiment. The system 500 can include a processor 510, a memory 520, a storage device 530, and input/output devices 540. Each of the components 510, 520, 530, and 540 are interconnected using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530 to display graphical information for a user interface on the input/output device 540.

The memory 520 is a computer readable medium such as volatile or non volatile that stores information within the system 500. The storage device 530 is capable of providing persistent storage for the system 500. The storage device 530 may be a floppy disk device, a hard disk device, an optical disk device, or a tape device, or other suitable persistent storage means. The input/output device 540 provides input/output operations for the system 500. In one implementation, the input/output device 540 includes a keyboard and/or pointing device. In another implementation, the input/output device 540 includes a display unit for displaying graphical user interfaces.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions tangibly stored on a computer-readable storage device for execution by, or to control the operation of, data processing apparatus. In addition, the one or more computer program products can be tangibly encoded in a propagated signal, which is an artificially generated signal, e.g., a machine-generated electrical, optical, or electromagnetic signal, that is generated to encode information for transmission to suitable receiver apparatus for execution by a computer. The computer-readable storage device can be a machine-readable storage device, a machine-readable storage substrate, a memory device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, a cross-platform runtime environment, or a combination of one or more of them. In addition, the apparatus can employ various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other.

While this specification contains many implementation details, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
receiving a query for images, the images including one or more of static images, moving images, or images within multimedia content;
obtaining a plurality of search results, each search result identifying a respective image that is responsive to the query;
selecting a first plurality of images from the identified images wherein each image of the first plurality of images is associated with first data indicating a count of times the image was selected by first users as a search result responsive to a first query corresponding to the query;
selecting a second plurality of images from the identified images wherein each image of the second plurality of images is associated with second data indicating a count of times the image was selected by second users as a search result responsive to a second query corresponding to the query, wherein the second users have a language or a locale that is the same as that of a user who submitted the query;
calculating a similarity between the first plurality of images and the second plurality of images, wherein calculating similarity includes comparing a number of images in common between the first plurality of images and the second plurality of images;
ordering the search results based on the calculated similarity; and
providing one or more of the ordered search results.

2. The method of claim 1 wherein the ordering of the search results is based on, at least, the second data when the similarity between the first plurality of images and the second plurality of images is less than a specified threshold value.

3. The method of claim 1 wherein the ordering of the search results is based on, at least, the first data when the similarity between the first plurality of images and the second plurality of images is greater than or equal to a specified threshold value.

4. The method of claim 1 wherein the first plurality of images includes top k images identified by image search results responsive to the first query that are most frequently selected by the first group of users.

5. The method of claim 1 wherein the second plurality of images includes top k images identified by image search results responsive to the second query that are most frequently selected by the second group of users.

6. A system comprising:
data processing apparatus programmed to perform operations comprising:
receiving a query for images, the images including one or more of static images, moving images, or images within multimedia content;
obtaining a plurality of search results, each search result identifying a respective image that is responsive to the query;
selecting a first plurality of images from the identified images wherein each image of the first plurality of images is associated with first data indicating a count of times the image was selected by first users as a search result responsive to a first query corresponding to the query;
selecting a second plurality of images from the identified images wherein each image of the second plurality of images is associated with second data indicating a count of times the image was selected by second users as a search result responsive to a second query corresponding to the query, wherein the second users have a language or a locale that is the same as that of a user who submitted the query;
calculating a similarity between the first plurality of images and the second plurality of images, wherein calculating similarity includes comparing a number of images in common between the first plurality of images and the second plurality of images;

ordering the search results based on the calculated similarity; and providing one or more of the ordered search results.

7. The system of claim 6 wherein the ordering of the search results is based on, at least, the second data when the similarity between the first plurality of images and the second plurality of images is less than a specified threshold value.

8. The system of claim 6 wherein the ordering of the search results is based on, at least, the first data when the similarity between the first plurality of images and the second plurality of images is greater than or equal to a specified threshold value.

9. The system of claim 6 wherein the first plurality of images includes top k images identified by image search results responsive to the first query that are most frequently selected by the first group of users.

10. The system of claim 6 wherein the second plurality of images includes top k images identified by image search results responsive to the second query that are most frequently selected by the second group of users.

11. Computer instructions stored on a computer-readable medium that, when executed by data processing apparatus, cause the data processing apparatus to perform operations comprising:

receiving a query for images, the images including one or more of static images, moving images, or images within multimedia content;

obtaining a plurality of search results, each search result identifying a respective image that is responsive to the query;

selecting a first plurality of images from the identified images wherein each image of the first plurality of images is associated with first data indicating a count of times the image was selected by first users as a search result responsive to a first query corresponding to the query;

selecting a second plurality of images from the identified images wherein each image of the second plurality of images is associated with second data indicating a count of times the image was selected by second users as a search result responsive to a second query corresponding to the query, wherein the second users have a language or a locale that is the same as that of a user who submitted the query;

calculating a similarity between the first plurality of images and the second plurality of images, wherein calculating similarity includes comparing a number of images in common between the first plurality of images and the second plurality of images;

ordering the search results based on the calculated similarity; and providing one or more of the ordered search results.

12. The computer instructions of claim 11 wherein the ordering of the search results is based on, at least, the second data when the similarity between the first plurality of images and the second plurality of images is less than a specified threshold value.

13. The computer instructions of claim 11 wherein the ordering of the search results is based on, at least, the first data when the similarity between the first plurality of images and the second plurality of images is greater than or equal to a specified threshold value.

14. The computer instructions of claim 11 wherein the first plurality of images includes top k images identified by image search results responsive to the first query that are most frequently selected by the first group of users.

15. The computer instructions of claim 11 wherein the second plurality of images includes top k images identified by image search results responsive to the second query that are most frequently selected by the second group of users.

* * * * *